(12) United States Patent
Sharma

(10) Patent No.: US 9,438,748 B2
(45) Date of Patent: Sep. 6, 2016

(54) CDF TRACKING FOR OFFLINE CHARGING

(71) Applicant: Alcatel-Lucent USA Inc., Murray Hill, NJ (US)

(72) Inventor: Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 7 days.

(21) Appl. No.: 14/499,030

(22) Filed: Sep. 26, 2014

(65) Prior Publication Data

US 2016/0094722 A1    Mar. 31, 2016

(51) Int. Cl.
| *H04M 15/00* | (2006.01) |
| *H04W 4/24* | (2009.01) |
| *H04L 29/08* | (2006.01) |
| *H04L 12/14* | (2006.01) |

(52) U.S. Cl.
CPC .......... *H04M 15/65* (2013.01); *H04L 12/1407* (2013.01); *H04L 67/1002* (2013.01); *H04L 67/1027* (2013.01); *H04W 4/24* (2013.01); *H04M 15/31* (2013.01); *H04M 15/41* (2013.01)

(58) Field of Classification Search
None
See application file for complete search history.

(56) References Cited

U.S. PATENT DOCUMENTS

| 2009/0088129 | A1* | 4/2009 | Cai ..................... H04L 12/1403 455/406 |
| 2012/0030077 | A1* | 2/2012 | Pei ......................... G06Q 30/04 705/34 |
| 2012/0123914 | A1 | 5/2012 | Sharma |
| 2012/0224531 | A1* | 9/2012 | Karuturi ............... H04W 40/02 370/328 |
| 2013/0091041 | A1 | 4/2013 | Sharma |
| 2013/0188554 | A1* | 7/2013 | Cai ....................... H04M 15/65 370/328 |

OTHER PUBLICATIONS

Calhoun, P., Diameter Base Protocol, Network Working Group, RFC 3588, Sep. 2003.
3rd Generation Partnership Project, Charging Data Record (CDR) Transfer, 3GPP TS 32.295, Version 12.0.0 (Sep. 2013).
3rd Generation Partnership Project, Charging Data Record (CDR) File Format and Transfer, 3GPP TS 32.297, Version 12.0.0 (Mar. 2014).

* cited by examiner

*Primary Examiner* — Charles Appiah
*Assistant Examiner* — Margaret G Mastrodonato
(74) *Attorney, Agent, or Firm* — Duft Bornsen & Fettig, LLP

(57) ABSTRACT

Systems and methods that track Charging Data Functions (CDFs) that handle accounting requests for a session. One embodiment comprises a distributor unit that receives an interim accounting request for a session. The interim accounting request includes a tracking parameter that includes one or more CDF identifiers (ID) indicating one or more CDFs that handled accounting requests for the session. The distributor unit processes the tracking parameter to identify a first CDF ID for a first destination CDF that handled accounting requests for the session. When the first destination CDF is not available to receive the interim accounting request, the distributor unit selects a second destination CDF for the interim accounting request based on a distribution algorithm. The distributor unit adds a second CDF ID for the second destination CDF in the tracking parameter of the interim accounting request, and transmits the interim accounting request to the second destination CDF.

20 Claims, 6 Drawing Sheets

CDF TRACKING FOR OFFLINE CHARGING

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device accessing the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS). The charging events may be provided by the CTF in an accounting request, such as a Diameter Accounting Request (ACR).

The CDF receives the charging events from one or more CTFs, and uses the information included in the charging events to construct CDRs. A CDR is a formatted collection of information about a chargeable event (e.g., time of call or session set-up, time of call or session tear-down, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

A typical operator network will utilize multiple CDFs and CGFs to implement offline charging. Thus, a front-end device, such as a Diameter Routing Agent (DRA), is used in conjunction with the OFCS to distribute charging events from the CTFs to the CDFs. The front-end device typically uses a distribution algorithm to select a CDF for a particular session. For example, a distribution algorithm may process a session identifier from a Diameter ACR with a hashing function or another function to select a CDF. The front-end device then routes the Diameter ACR to the selected CDF.

SUMMARY

Embodiments described herein provide a technique for tracking CDFs that handle charging events for a session. During a session, a CDF that is selected to handle charging events for the session may go out-of-service (OOS) and be unavailable to handle future charging events. For example, a first CDF (CDF1) may be selected by a front-end device (e.g., DRA) to handle accounting requests for a session. If CDF1 goes out-of-service during the session, then the front-end device may select a second CDF (CDF2) to handle accounting requests for the session. In order to track what CDFs have been selected to handle accounting requests for the session, a new tracking parameter is defined in the charging protocol, such as Diameter protocol. The tracking parameter is for CDF identifiers (IDs) for the CDFs selected to handle accounting requests for the session. The CDF IDs are added in the tracking parameter so that the CDF IDs indicate the CDFs that handled accounting requests for the session. For instance, the tracking parameter may indicate [CDF1 ID, CDF2 ID] in the above example, which shows the CDFs that handled accounting requests for the session. Entities involved in offline charging may then process the tracking parameter to determine which CDFs possess accounting requests for a failed-over session in order to handle the generation of a complete CDR.

One embodiment comprises a distributor unit configured to connect to a plurality of CDFs of an offline charging system. The distributor unit is configured to receive an interim accounting request (e.g., a Diameter Accounting Request (ACR)) from a Charging Trigger Function (CTF) for a session, where the interim accounting request includes a tracking parameter that includes CDF identifiers (IDs) indicating destination CDFs that handled accounting requests for the session. The distributor unit is configured to process the tracking parameter in the interim accounting request to identify a first CDF ID for a first destination CDF that handled accounting requests for the session. When the first destination CDF is not available to receive the interim accounting request, the distributor unit is configured to select a second destination CDF for the interim accounting request based on a distribution algorithm. The distributor unit is configured to add a second CDF ID for the second destination CDF in the tracking parameter of the interim accounting request, and to transmit the interim accounting request to the second destination CDF.

In another embodiment, the distributor unit is configured to scan the tracking parameter for an appearance of the second CDF ID, and to add the second CDF ID in the tracking parameter when the second CDF ID does not already appear in the tracking parameter.

In another embodiment, the distributor unit is configured to add the second CDF ID in the tracking parameter responsive to selecting the second destination CDF based on the distribution algorithm.

In another embodiment, the interim accounting request comprises a Diameter Accounting Request (ACR), and the tracking parameter comprises a Diameter Attribute Value Pair (AVP) defined for the CDF IDs indicating the CDFs that handled accounting requests for the session.

In another embodiment, the distributor unit is configured to receive an interim accounting answer from the second destination CDF that includes the tracking parameter, and to send the interim accounting answer to the CTF.

In another embodiment, the distribution algorithm comprises a consistent hashing algorithm that selects the second destination CDF based on a session identifier in the interim accounting request.

In another embodiment, the second destination CDF is configured to receive a stop accounting request from the CTF indicating an end to the session, where the stop accounting request includes the tracking parameter. The second destination CDF is configured to determine a total number of the accounting requests for the session, to determine a number of accounting requests handled by the second destination CDF, and to calculate a percentage of accounting requests handled by the second destination CDF. When the percentage of accounting requests handled by the second destination CDF is greater than 50%, the second destination CDF is configured to select itself as a reconciliation host to generate a Charging Data Record (CDR) for the session. When the percentage of accounting requests handled by the second destination CDF is less than 50%, the second destination CDF is configured to query other destination CDFs indicated in the tracking parameter for a number of accounting requests handled by each destination CDF, and to select the reconciliation host based on the destination CDF that handled the highest number of accounting requests.

Another embodiment comprises a method of distributing accounting requests. The method includes receiving an interim accounting request in a distributor unit from a CTF for a session, where the distributor unit connects to a plurality of CDFs for offline charging. The interim accounting request includes a tracking parameter that includes CDF IDs indicating destination CDFs that handled accounting requests for the session. The method includes processing the tracking parameter in the interim accounting request to identify a first CDF ID for a first destination CDF that handled accounting requests for the session. When the first destination CDF is not available to receive the interim accounting request, the method includes selecting a second destination CDF for the interim accounting request based on a distribution algorithm. The method includes adding a second CDF ID for the second destination CDF in the tracking parameter of the interim accounting request, and transmitting the interim accounting request to the second destination CDF.

Another embodiment comprises a plurality of CDFs for offline charging for a session. A first one of the CDFs comprising a selection unit configured to receive a stop accounting request for the session indicating an end to the session, where the stop accounting request includes a tracking parameter that includes CDF IDs indicating the CDFs that handled accounting requests for the session. The selection unit is configured to select a reconciliation host to generate a CDR for the session from the CDFs indicated in the tracking parameter.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
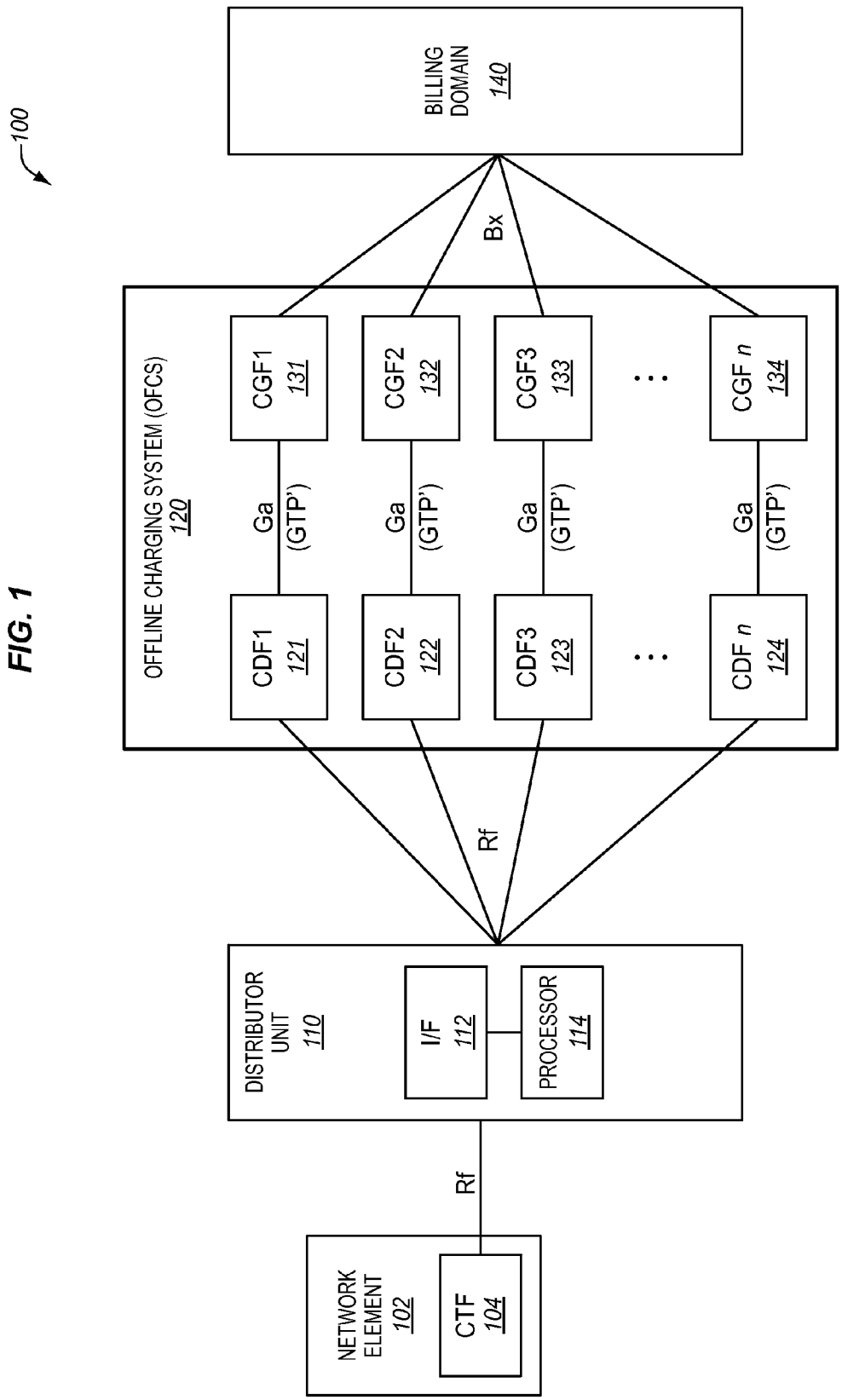
FIG. 1 illustrates an offline charging architecture in an exemplary embodiment.

FIG. 1 illustrates an offline charging architecture 100 in an exemplary embodiment. Architecture 100 may be implemented in a circuit-switched network or a packet-switched network that provides services to its subscribers (i.e., an end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an offline charging system (OFCS) 120 through a distributor unit 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 may use a Diameter Rf interface. Therefore, CTF 104 assembles the charging information into accounting requests, such as a Diameter Rf Accounting Request (ACR). Although one CTF 104 is illustrated in FIG. 1, there may be many CTFs in contact with distributor unit 110. Although not specifically illustrated in FIG. 1, network element 102 may include a processor or other hardware component to implement CTF 104.

Diameter protocol is shown as the charging protocol in FIG. 1. However, other charging protocols may be used. Therefore, reference to an accounting request or accounting answer as discussed herein may refer to Diameter protocol or another charging protocol.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, CTF 104 may transmit 0, 1, or multiple interim accounting requests depending on the proceeding of the session.

In this embodiment, OFCS 120 includes a plurality of CDFs (CDF1-CDFn) 121-124. A CDF comprises an element or module within OFCS 120 that receives charging events from CTFs within network elements, formats the charging events into CDRs, and sends the CDRs to a CGF. OFCS 120 also includes a plurality of CGFs (CGF1-CGFn) 131-134. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). The CDFs in OFCS 120 may communicate with the CGFs over a Diameter Ga interface. In the case shown in FIG. 1, GTP' may be used on the Ga interface to transport CDRs from the CDFs to the CGFs. While a 1:1 relationship is shown between the CDFs and CGFs in FIG. 1, an N:1 relationship is also possible. Although not specifically illustrated in FIG. 1, OFCS 120 may include one or more processors or other hardware components that implement CDFs 121-124 and CGFs 131-134.

Distributor unit 110 is implemented between CTFs (e.g., CTF 104) and the CDFs 121-124 in OFCS 120. The purpose of distributor unit 110 is to distribute accounting requests (e.g., Diameter ACRs) from CTFs among the multiple CDFs 121-124 within OFCS 120. An accounting request comprises a message for offline charging that reports a charging event, one example of which is a Diameter ACR.

In this embodiment, distributor unit 110 includes an interface (I/F) 112 and a processor (PROC'R) 114. Interface 112 comprises a component (e.g., hardware, software, or a combination of hardware and software) for communicating via Diameter Rf protocol or another type of charging protocol. Processor 114 comprises a component (i.e., hardware) that performs logic to distribute accounting requests to the CDFs 121-124. Although distributor unit 110 is illustrated as being outside of OFCS 120, distributor unit 110 may be implemented on the same platform as OFCS 120.

The task of distributing accounting requests may include considering the weights, current load index, and other parameters of CDFs 121-124 to select a CDF instance for handling accounting requests for a session. Distributor unit 110 may follow a round-robin strategy in selecting a CDF for a particular session. Distributor unit 110 may work as a Back to Back User Agent (B2BUA), where charging sessions (e.g., Diameter sessions) with a CTF are terminated on distributor unit 110, and equivalent and corresponding charging sessions are started between distributor unit 110 and the selected CDF. Each CTF would establish a connection with distributor unit 110, and send an accounting request to distributor unit 110 that includes a session identifier (ID). The session ID is unique for the CTF for each session it reports.

Distributor unit 110 is configured to select CDFs for handling accounting requests based on a distribution algorithm. A distribution algorithm comprises any set of rules for calculating a CDF identity for a session. In one embodiment, distributor unit 110 may use a "consistent hashing" algorithm to select a CDF identity for a session. The consistent hashing algorithm may use the session ID in the accounting requests and CDF identifiers to select a CDF for a given accounting request. With n CDFs present, such as in FIG. 1, the consistent hashing algorithm would generate 'n' numbers for a given session ID. The highest of the numbers may be chosen as the CDF for the session. For example, distributor unit 110 may statically determine a hashed value for each CDF instance from its name:

$Hs = F(CDFName)$

E.g., $Hs1 = F(SvrNmCDF1)$, $Hs2 = F(SvrNmCDF2)$, and $Hs3 = F(SvrNmCDF3)$

Then, distributor unit 110 may dynamically determine a hashed value for each session ID (SID):

$Hi = F(SessionID)$.

This value is used in computing the hash for each set of (SID, CDFName) for each of the CDFs:

$Hc = F(Hs, Hi)$, where $i = 1 \ldots n$ ($n = 3$ in this example)

Distributor unit 110 may then select the CDF with highest Hc value for handling the session with the session ID in question.

After distributor unit 110 selects a CDF for a session, all accounting requests for the session may be forwarded to this CDF. However, situations may arise where one or more CDFs go out-of-service for a time period and will not be available to handle accounting requests. For example, if the CDFs are executed on a blade server, then one or more CDFs may be out-of-service if there are problems with one or more of the blades. If the CDF selected for a session goes out-of-service, then a conventional distribution mechanism will select an alternate CDF for subsequent accounting requests (e.g., ACR (Interim/Stop)). Thus, the primary CDF will receive some accounting requests for the session, and the alternate CDF will receive other accounting requests for the session. This will cause "incomplete CDR" generation on the primary CDF for the first part of the session, and incomplete CDR generation on the alternate CDF for the second part of the session. This increases the complexity for the downstream billing mediation system to combine the multiple incomplete CDRs into a coherent and complete CDR for the session.

In the following embodiments, a new tracking parameter is defined in the charging protocol (e.g., Diameter) to record the CDFs selected for a session to receive/handle accounting requests. For example, if CDF1 is initially selected for a session and becomes unavailable, then CDF2 may be selected to receive accounting requests for the session. If CDF2 becomes unavailable, then CDF3 may be selected to receive accounting requests for the session. Thus, the tracking parameter may indicate [CDF1, CDF2, CDF3], which shows the sequence of CDFs that were selected to handle accounting requests for the session. The entities involved in offline charging may add or append CDF IDs to the tracking parameter if a new CDF is selected, and/or may access the tracking parameter to identify those CDFs that received accounting requests for the session. CDFs selected for a particular session may be referred to as "destination" CDFs for the session.

To illustrate the use of the tracking parameter in FIG. 1, CTF 104 detects a chargeable event for a service provided by network element 102, and CTF 104 assembles information for the chargeable event into an accounting request. For example, the accounting request may comprise a Diameter Rf ACR. CTF 104 may or may not insert the tracking parameter in the accounting request at this point. For example, if the accounting request is a start request for initiating charging (e.g., an ACR(Start)), then no destination CDF has been selected for this session. Thus, CTF 104 cannot insert a CDF ID for the destination CDF into a tracking parameter. If the accounting request is an interim request (e.g., ACR(Interim)) or a stop request (e.g., ACR(Stop)), then a destination CDF has been selected for this session and CTF 104 may be able to populate the tracking parameter. CTF 104 then sends the accounting request toward OFCS 120.

Figure 2:
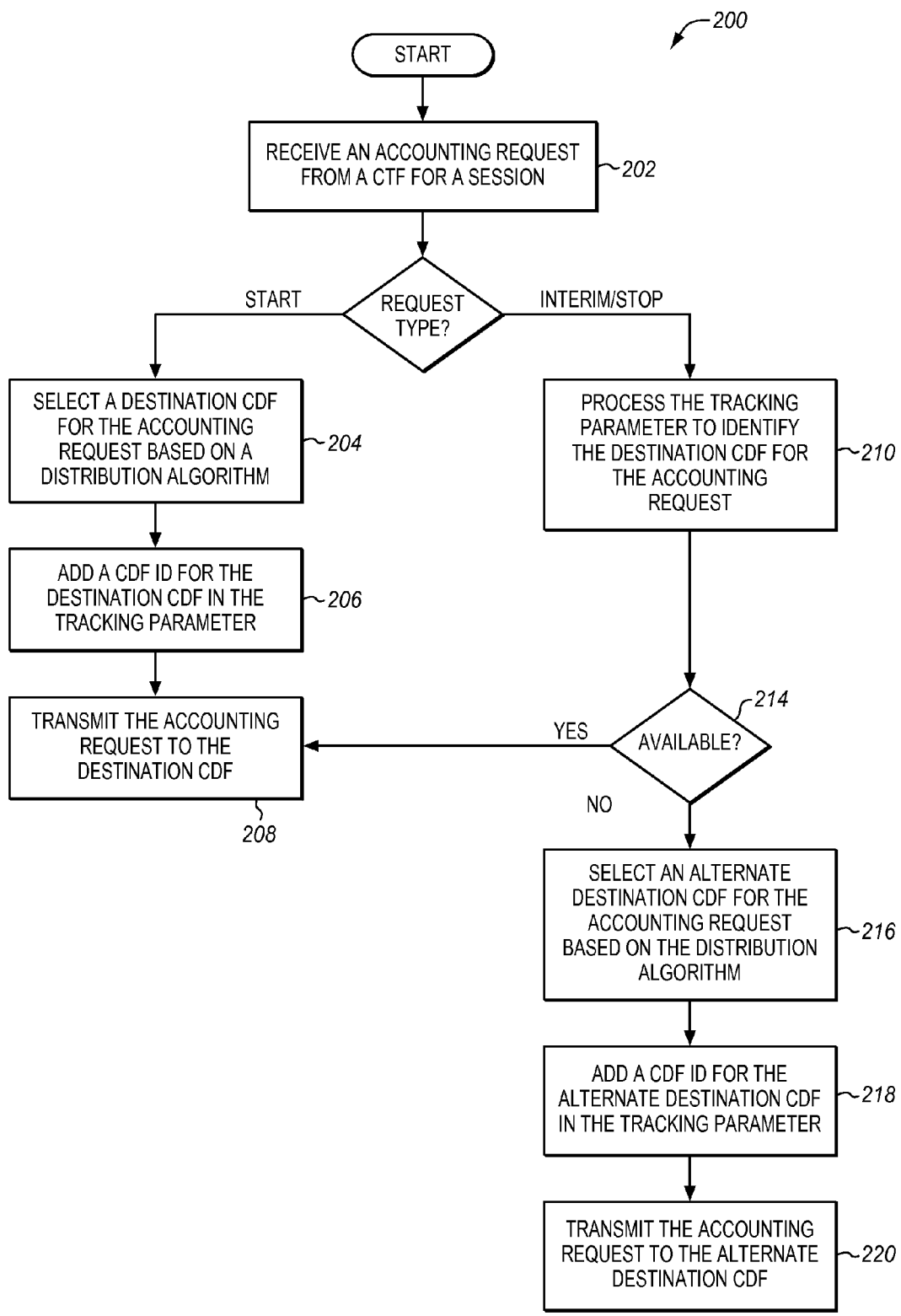
FIG. 2 depicts a flow chart illustrating a method of distributing accounting requests in an exemplary embodiment.

FIG. 2 depicts a flow chart illustrating a method 200 of distributing accounting requests in an exemplary embodiment. The steps of method 200 will be described with reference to distributor unit 110 in FIG. 1, but those skilled in the art will appreciate that method 200 may be performed in other systems. Also, the steps of the flow charts described herein are not all inclusive and may include other steps not shown, and the steps may be performed in an alternative order.

Interface 112 of distributor unit 110 receives the accounting request from CTF 104 (step 202) for the session. Processor 114 then determines the type of accounting request (step 203), such as start, interim, or stop.

If the accounting request is a start accounting request indicating the beginning of a charging session, then processor 114 selects a destination CDF (e.g., one of CDFs 121-124) for the accounting request based on the distribution algorithm (step 204). Although a distribution algorithm is used to select the CDF, processor 114 may use other methods of selecting a CDF other than a distribution algorithm, such as a lookup table. Processor 114 adds a CDF ID for the destination CDF in the tracking parameter of the accounting request (step 206). Because this is the first instance where a destination CDF has been selected for the session, there is no other CDF ID present in the tracking parameter. Processor 114 then transmits the accounting request to the destination CDF (step 208) through interface 112.

If the accounting request is an interim accounting request during the charging session, then processor 114 processes the tracking parameter in the accounting request to identify a CDF ID for one or more destination CDFs that handled accounting requests for the session (step 210). When an interim accounting request is received, it is assumed that a destination CDF has already been selected for the session. Thus, the tracking parameter is populated with at least one CDF ID. If more than one destination CDF has been selected (e.g., a CDF has gone out-of-service so an alternate CDF has been selected), then the tracking parameter is populated with multiple IDs indicating the CDFs selected for the session. Processor 114 may then use the CDF IDs in the tracking parameter to identify the destination CDF for the accounting request (step 212). For example, if the tracking parameter includes one CDF ID, then processor 114 may identify the destination CDF for the accounting request based on the CDF ID. If the tracking parameter includes more than one CDF ID, then processor 114 may identify the destination CDF for the accounting request based on the last CDF ID indicated in the tracking parameter. For example, if the tracking parameter indicates [CDF1 ID, CDF2 ID, CDF3 ID], then processor 114 may identify the destination CDF as "CDF3", because this is the last CDF indicated in the tracking parameter. Processor 114 in essence overrides its normal logic of selecting a destination CDF for an accounting request using the distribution algorithm when the accounting request includes the tracking parameter indicating one or more destination CDFs.

Processor 114 then determines or verifies that the destination CDF is available (step 214). It may be the case that one or more CDFs 121-124 go out-of-service for a time period. Therefore, processor 114 determines whether the destination CDF is available or in service for this accounting request. If the destination CDF is available, then processor 114 transmits the accounting request to the destination CDF (step 208). The accounting request still includes the tracking parameter. If the destination CDF is not available, then processor 114 selects an alternate destination CDF (e.g., one of CDFs 121-124) for the accounting request based on the distribution algorithm (step 216). Processor 114 adds or appends a CDF ID for the alternate destination CDF in the tracking parameter of the accounting request (step 218). Processor 114 transmits the accounting request to the alternate destination CDF (step 220).

For step 218, processor 114 adds the CDF ID in the tracking parameter as additional data in the parameter. For example, if the tracking parameter initially includes [CDF1 ID], then processor 114 may add a CDF ID for another destination CDF so that the tracking parameter includes [CDF1 ID, CDF2 ID]. Processor 114 does not replace the CDF ID of a destination CDF when a new destination CDF is selected in a failover scenario. Instead, processor 114 adds to the data in the tracking parameter by appending a new CDF ID. Therefore, the tracking parameter indicates a list or record of each destination CDF selected to handle accounting requests for the session. In one embodiment, the tracking parameter may also indicate a sequence or order of destination CDFs selected to handle accounting requests for the session. For example, if the tracking parameter includes [CDF1 ID, CDF2 ID], this may indicate that CDF1 first handled accounting requests for a session, and failover occurred so that CDF2 handled accounting requests for the session. If the tracking parameter includes [CDF1 ID, CDF2 ID, CDF1 ID], this may indicate that CDF1 first handled accounting requests for a session, failover occurred so that CDF2 handled accounting requests for the session, and then accounting requests were again routed to CDF1 (assuming CDF1 recovered).

There may be different logic for adding CDF IDs to the tracking parameter. In one embodiment, processor 114 may add a CDF ID to the tracking parameter responsive to a new destination CDF being selected after a failover scenario. Thus, a CDF ID may appear multiple times in the tracking parameter if a destination CDF gets selected at different times during failover. The tracking parameter will also show a sequence or order in which destination CDFs were selected for a session. In another embodiment, before processor 114 adds a CDF ID to the tracking parameter, it may scan the tracking parameter for an appearance of the CDF ID. Processor 114 may add the CDF ID to the tracking parameter only when the CDF ID does not already appear in the tracking parameter. If the CDF ID already appears, then processor 114 may not add the CDF ID to the tracking parameter. In this scenario, the tracking parameter will simply indicate the destination CDFs that handled accounting requests, and there may not be any particular order to the CDF IDs in the parameter.

If the accounting request is a stop accounting request to end the charging session, then processor 114 operates as with an interim accounting request.

The tracking parameter may be inserted in all accounting messages for this session. For example, after a CDF is selected by distributor unit 110 for the session (e.g., based on the distribution algorithm), distributor unit 110 may insert the tracking parameter with the identity of the destination CDF in each accounting message for the session. Therefore, accounting requests sent from distributor unit 110 to the destination CDF include the tracking parameter. Likewise, accounting answers (e.g., Diameter ACA) sent from the destination CDF to distributor unit 110 may also include the tracking parameter. Further, accounting answers sent from distributor unit 110 to CTF 104 may also include the tracking parameter. Therefore, distributor unit 110 is able to notify the other elements (e.g., CTF 104 and the destination CDF) of the CDFs that handled accounting requests for session.

In order to provide the tracking parameter in the requests/answers as described above, a new Attribute Value Pair (AVP) may be defined in Diameter protocol. The new AVP may have an attribute name of "CDFTracker", although other attribute names may be used. This AVP is optional and its purpose is to create a marker for the messages that belong to a particular Diameter session. This AVP is of type "OctetString" and is populated with the identity of one or more CDF instances selected for a Diameter session. The following illustrates the new AVP in a Diameter ACR:

```
<ACR> ::= < Diameter Header: 271, REQ, PXY >
    < Session-Id >
    { Origin-Host }
    { Origin-Realm }
    { Destination-Realm }
    { Accounting-Record-Type }
    { Accounting-Record-Number }
    [ Acct-Application-Id ]
    [ Vendor-Specific-Application-Id ]
    [ User-Name ]
    [ Destination-Host ]
    [ Accounting-Sub-Session-Id ]
    [ Acct-Session-Id ]
    [ Acct-Multi-Session-Id ]
    [ Acct-Interim-Interval ]
    [ Accounting-Realtime-Required ]
    [ Origin-State-Id ]
    [ Event-Timestamp ]
    * [ Proxy-Info ]
    * [ Route-Record ]
    [CDFTracker]
    * [ AVP ]
```

Following the "SISE" convention, the CDFTracker AVP would be expected to follow "-IS-", meaning that it is not expected in the ACR (Start) and ACR (Event), while it is expected in the ACR (Interim) and ACR (Stop).

The following illustrates the new AVP in a Diameter ACA:

```
<ACA> ::= < Diameter Header: 271, PXY >
    < Session-Id >
    { Result-Code }
    { Origin-Host }
    { Origin-Realm }
    { Accounting-Record-Type }
    { Accounting-Record-Number }
    [ Acct-Application-Id ]
    [ Vendor-Specific-Application-Id ]
    [ User-Name ]
    [ Accounting-Sub-Session-Id ]
    [ Acct-Session-Id ]
    [ Acct-Multi-Session-Id ]
    [ Error-Message ]
    [ Error-Reporting-Host ]
    [ Failed-AVP ]
    [ Acct-Interim-Interval ]
    [ Accounting-Realtime-Required ]
    [ Origin-State-Id ]
    [ Event-Timestamp ]
    * [ Proxy-Info ]
    [CDFTracker]
    * [ AVP ]
```

Following the "SISE" convention, the CDFTracker AVP would be expected to follow "SI--", meaning that it is not expected in the ACA(Stop) and ACA(Event), while it is expected in the ACA(Start) and ACA(Interim).

Figure 3:
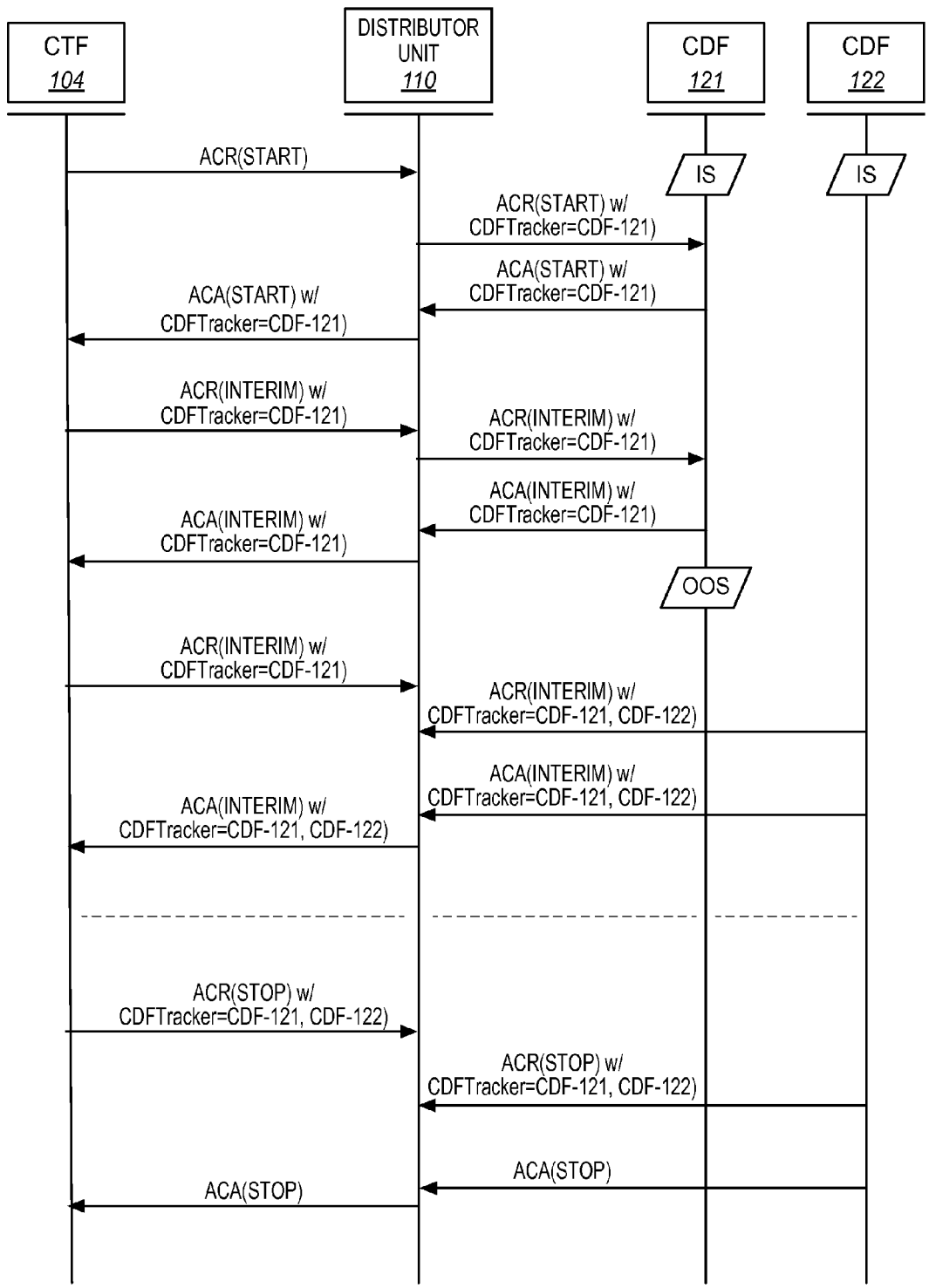
FIG. 3 depicts a message diagram illustrating the distribution of Diameter ACRs in an exemplary embodiment.

To illustrate use of the tracking parameter, the following describes Diameter messaging using a CDRTracker AVP. FIG. 3 depicts a message diagram illustrating distribution of Diameter ACRs in an exemplary embodiment. To begin in FIG. 3, CTF 104 detects a chargeable event for a service provided by network element 102 (see FIG. 1), and assembles an ACR(Start) for the Diameter session. CTF 104 then sends the ACR(Start) to distributor unit 110. At this point, there has not been a destination CDF selected for the Diameter session, so CTF 104 is not able to populate the ACR(Start) with the tracking parameter.

In response to receiving the ACR(Start), distributor unit 110 selects a destination CDF for the Diameter session based on the distribution algorithm (i.e., consistent hashing algorithm). In this instance, distributor unit 110 selects CDF 121 to handle the Diameter session. Distributor unit 110 also determines or verifies that CDF 121 is available or in-service (IS). When a new destination CDF is selected for a session (such as based on the distribution algorithm), distributor unit 110 adds a CDF ID (i.e., CDF-121) for CDF 121 in the tracking parameter (e.g., "CDFTracker" AVP) of the ACR (Start). Distribution unit 110 then routes the ACR(Start) to CDF 121.

CDF 121 responds to the ACR(Start) with an ACA(Start), which distributor unit 110 routes to CTF 104. The ACA message also includes the tracking parameter populated with the CDF ID for CDF 121.

When CTF 104 detects another chargeable event for the session, it assembles an ACR(Interim). CTF 104 also determines that a destination CDF has already been selected for this Diameter session based on the tracking parameter provided in a prior ACA message (i.e., ACA(Start)). Therefore, CTF 104 populates the tracking parameter (e.g., "CDF-Tracker" AVP) in the ACR(Interim) with a value indicating the identity of CDF 121. CTF 104 then sends the ACR (Interim) to distributor unit 110. In response to receiving the ACR(Interim), distributor unit 110 processes the tracking parameter in the ACR(Interim) to identify a destination CDF already selected for the Diameter session, which is CDF 121. Distributor unit 110 determines or verifies that CDF 121 is available for the ACR(Interim). For this message, no new destination CDF was selected for the session. Thus, there is no need for distributor unit 110 to add a new CDF ID to the tracking parameter of the ACR(Interim). Distributor unit 110 then routes the ACR(Interim) to CDF 121.

CDF 121 responds to the ACR(Interim) with an ACA (Interim), which distributor unit 110 routes to CTF 104. The ACA message also includes the tracking parameter populated with the CDF ID for CDF 121.

When CTF 104 detects another chargeable event, it assembles an ACR(Interim) for the session and populates the tracking parameter (e.g., "CDFTracker" AVP) in the ACR (Interim) with a value indicating the identity of CDF 121. CTF 104 then sends the ACR(Interim) to distributor unit 110. In response to receiving the ACR(Interim), distributor unit 110 processes the tracking parameter in the ACR (Interim) to identify a destination CDF already selected for the Diameter session, which is CDF 121. Distributor unit 110 determines or verifies that CDF 121 is available for the ACR(Interim). In this case, CDF 121 has gone out-of-service (OOS) and is not available for the ACR(Interim). Therefore, distributor unit 110 selects an alternate destination CDF (e.g., CDF 122) for the Diameter session based on the distribution algorithm. Because a new destination CDF is selected, distributor unit 110 adds a CDF ID (i.e., CDF-122) for CDF 122 in the tracking parameter (e.g., "CDF-Tracker" AVP) in the ACR(Interim) to indicate CDF 122 as the destination CDF. As CDF IDs are added in this manner, the tracking parameter indicates the sequence of destination CDFs selected for the Diameter session as [CDF-121, CDF-122]. Distributor unit 110 then routes the ACR(Interim) to CDF 122.

CDF 122 responds to the ACR(Interim) with an ACA (Interim), which distributor unit 110 routes to CTF 104. The ACA message also includes the tracking parameter populated with the CDF IDs for CDF 121 and CDF 122.

Distributor unit 110 may operate in a similar fashion in response to additional ACRs(Interim) for the session to add CDFs IDs to the CDFTracker AVP if/when new destination CDFs are selected for the session.

At some point, CTF 104 will assemble an ACR(Stop) for the session, and populate the tracking parameter (e.g., "CDFTracker" AVP) in the ACR(Stop) with a value indicating the identity of CDF 121 and CDF 122. CTF 104 then sends the ACR(Stop) to distributor unit 110. In response to receiving the ACR(Stop), distributor unit 110 processes the tracking parameter in the ACR(Stop) to identify a destination CDF already selected for the Diameter session, which is CDF 122. When more than one CDF ID is listed in the tracking parameter, distributor unit 110 may look for the last CDF ID listed in the tracking parameter to identify the present destination CDF for the session. Distributor unit 110 determines whether CDF 122 is available for the ACR (Stop). In this case, CDF 122 is available for the ACR(Stop). Therefore, distributor unit 110 routes the ACR(Stop) to CDF 122. The tracking parameter already includes a CDF ID for CDF 122, so distributor unit 110 does not need to add the CDF ID to the tracking parameter.

CDF 122 responds to the ACR(Stop) with an ACA(Stop), which distributor unit 110 routes to CTF 104.

The above embodiments describe how distributor unit 110 distributes accounting requests, such as Diameter ACRs, to destination CDFs for a session. When the session ends and distributor unit 110 receives a stop accounting request, it routes the stop accounting request to a destination CDF. At this point, the accounting requests for the session are collected by one of the CDFs to generate a Charging Data Record (CDR). The CDF that generates a CDR for the session is referred to herein as a reconciliation host. The following describes a configuration of CDF 122, which may act as a reconciliation host.

Figure 4:
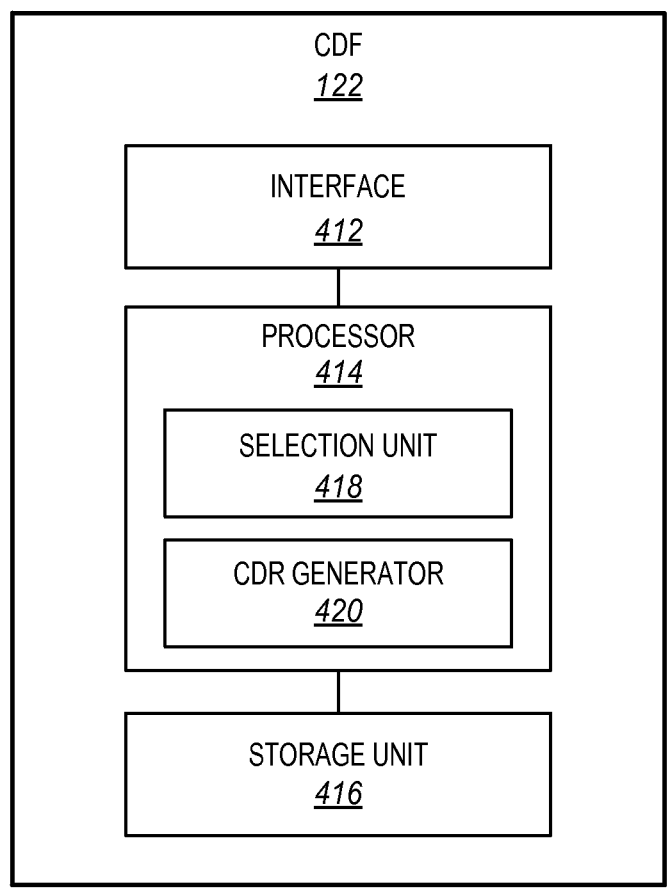
FIG. 4 illustrates a CDF in an exemplary embodiment.

FIG. 4 illustrates a CDF 122 in an exemplary embodiment. In this embodiment, CDF 122 includes an interface 412, a processor 414, and a storage unit 416. Interface 412 comprises a component (e.g., hardware, software, or a combination of hardware and software) for communicating with a CGF. Interface 412 may use GTP' or another protocol for communication. Processor 414 comprises a component that performs the functions of a CDF. Storage unit 416 comprises a component that stores data, such as a memory. In this embodiment, CDF 122 includes a selection unit 418, which is a component (e.g., hardware, software, or a combination of hardware and software) that is able to select a reconciliation host for a session. CDF 122 also includes a CDF generator 420, which is a component (e.g., hardware, software, or a combination of hardware and software) that is able to process accounting requests for a session to generate a CDR. A more detailed explanation of selection unit 418 and CDR generator 420 are provided below. Any CDF within OFCS 120 may have a similar configuration and operation as CDF 122.

Figure 5:
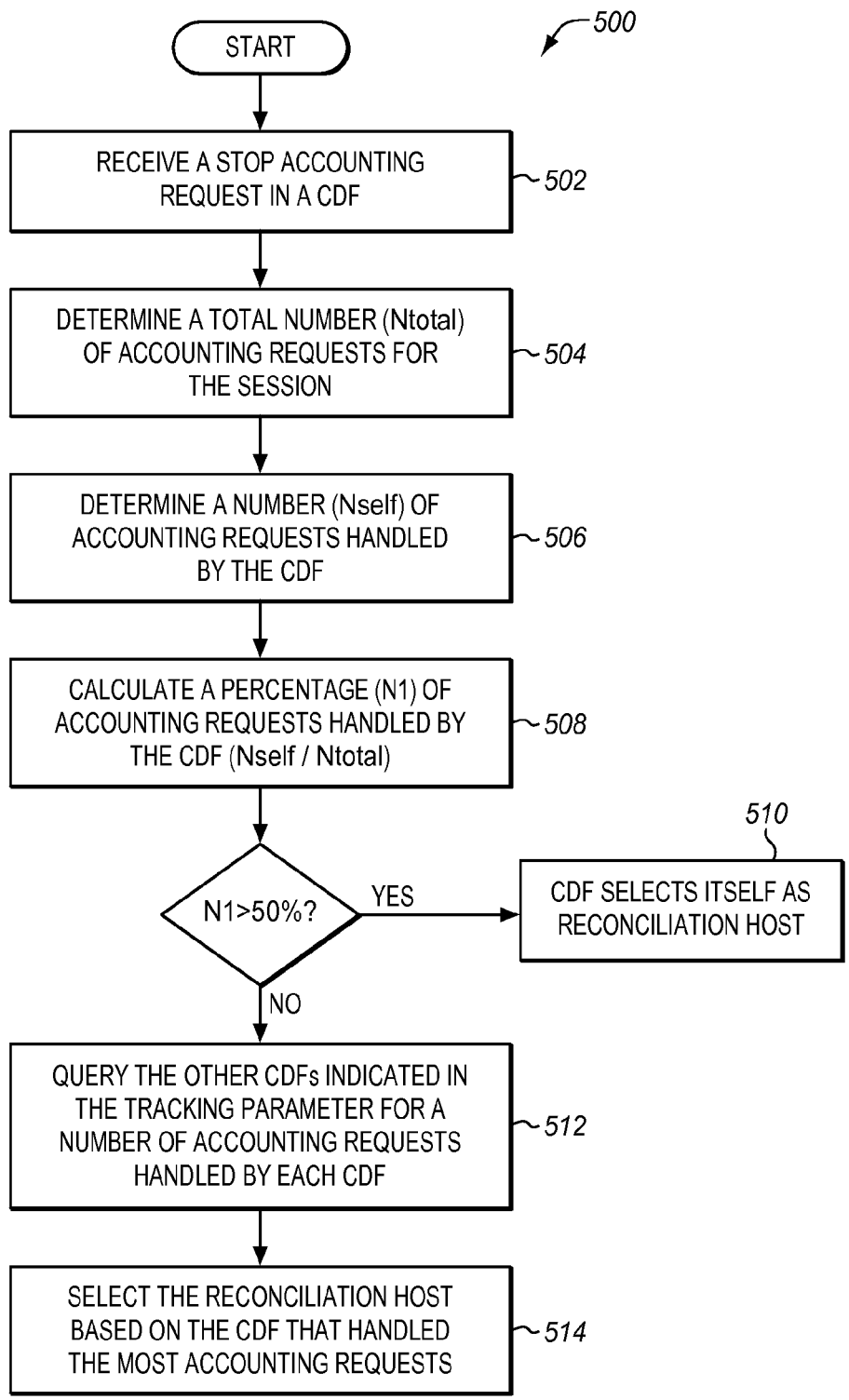
FIG. 5 depicts a flow chart illustrating a method of selecting a reconciliation host in an exemplary embodiment.

FIG. 5 depicts a flow chart illustrating a method 500 of selecting a reconciliation host in an exemplary embodiment. The steps of method 500 will be described with reference to CDF 122 in FIG. 4, but those skilled in the art will appreciate that method 500 may be performed in other systems.

To begin, CDF 122 receives the stop accounting request (step 502). In response to the stop accounting request, selection unit 418 in CDF 122 initiates a process to select a reconciliation host for generating a CDR based on the accounting requests for the session. Selection unit 418 may select a reconciliation host in a variety of ways. In the embodiment described herein, selection unit 418 may determine a total number (Ntotal) of accounting requests for the session (step 504). For example, if Diameter protocol is used, then selection unit 418 may process the Accounting Record Number (ARN) AVP of the last received message for the session, which is an ACR(Stop). The ARN is set to 0 for an ACR(Start), and for each subsequent ACR, the number is incremented by 1 until the ACR(Stop) arrives. Thus, the total number of ACRs received for a session may be determined as: Ntotal=ARN in ACR(Stop)+1.

Selection unit 418 also determines the number (Nself) of accounting requests handled by CDF 122 for the session (step 506). As CDF 122 receives and handles accounting requests for this session (indicated by a session ID), CDF 122 may maintain a counter to monitor the number of accounting requests it handles for the session. Selection unit 418 then calculates a percentage (N1) of accounting requests handled by CDF 122 for the session (step 508). The percentage (N1) of accounting requests handled by CDF 122 is determined by:

$$N1 = Nself/Ntotal$$

For example, if 20 total accounting requests were handled for the session and CDF 122 handled 10 of those messages, then the percentage (N1) of accounting requests for CDF 122 would be 50%.

If/when the percentage (N1) of accounting requests handled by CDF 122 is greater than 50%, selection unit 418 is able to determine that CDF 122 has handled the majority of accounting requests for the session. Thus, selection unit 418 selects CDF 122 as the reconciliation host for the session (step 510). Because CDF 122 has handled the majority of accounting requests for the session, it is desirable for CDF 122 to act as the reconciliation host for the session as it requires fewer resources to gather all of the accounting requests for the session from the other CDFs.

If/when the percentage (N1) of accounting requests handled by CDF 122 is less than 50%, selection unit 418 queries the other CDFs indicated in the tracking parameter of the stop accounting request (step 512). Selection unit 418 queries these CDFs for a number of accounting requests handled by each CDF. For example, if CDF 121 and CDF 123 were indicated in the tracking parameter, then selection unit 418 may query CDF 121 and CDF 123 for the number of accounting requests each one handled for the session. Selection unit 418 includes a request for a message count in the query along with a session ID. Each CDF answers the query with a message count. Selection unit 418 then selects the reconciliation host for the session based on the CDF that handled the most (i.e., the highest number) accounting requests (step 514). For example, if CDF 121 responds to selection unit 418 that it handled twelve accounting requests and CDF 123 responds to selection unit 418 that it handled twenty accounting requests, then selection unit 418 may select CDF 123 as the reconciliation host as it was the CDF that handled the most accounting requests for the session. If two or more of the CDFs handled the same number of accounting requests, then selection unit 418 may select the reconciliation host for the session based on a random number generator or some other algorithm in order to distribute the reconciliation task fairly amongst the CDFs.

When selection unit 418 selects a reconciliation host (other than CDF 122) such as in step 514, selection unit 418 sends a notification message to the reconciliation host. The notification message indicates that this CDF is to act as reconciliation host for the session, indicates the session ID for the session, and also indicates the other CDFs that handled accounting requests for the session. For example, the notification message may resemble:

Notification ("reconciliation host, session_ID, CDF-121, CDF-122)

Figure 6:
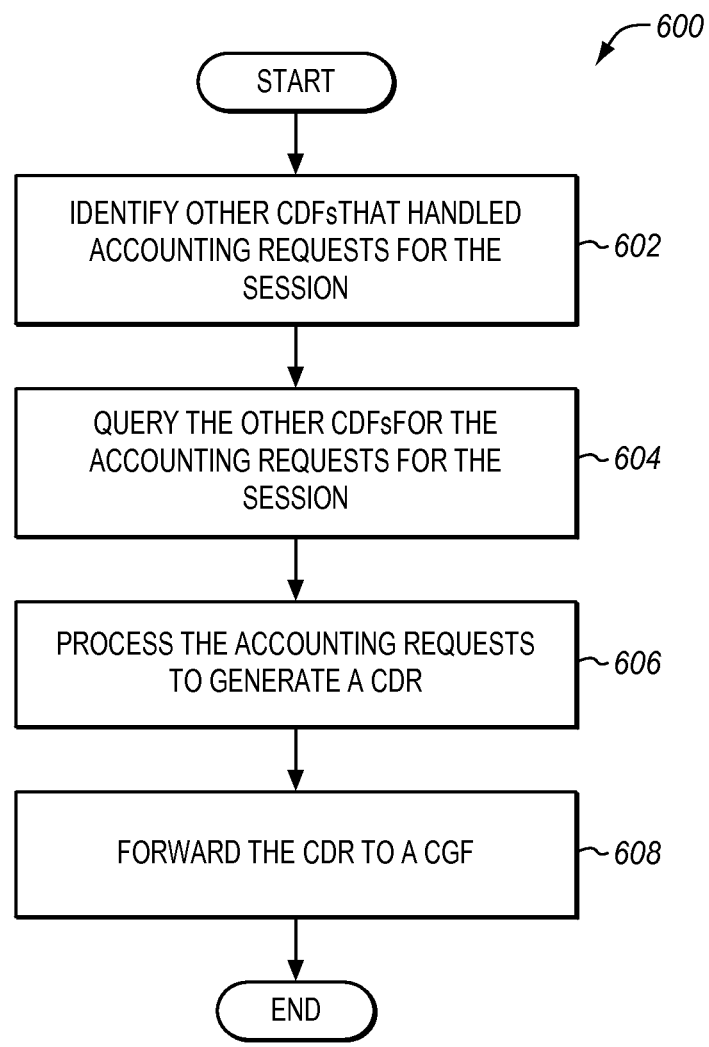
FIG. 6 depicts a flow chart illustrating a method of generating a CDR in an exemplary embodiment.

After a reconciliation host is selected, the host generates a CDR for the session based on the accounting requests for the session. FIG. 6 is a flow chart illustrating a method 600 of generating a CDR in an exemplary embodiment. The steps of method 600 will be described with reference to CDF 122 in FIG. 4, but those skilled in the art will appreciate that method 600 may be performed in other systems.

Assume again for this embodiment that CDF 122 was selected as the reconciliation host. CDF generator 420 identifies other CDFs that handled accounting requests for the session (step 602). For instance, the tracking parameter in the stop accounting request indicates all CDFs that handled accounting requests for the session. If the reconciliation host received the stop accounting request, then it may process the tracking parameter of the stop accounting request to identify the other CDFs. If the reconciliation host did not receive the stop accounting request, then it will receive a notification message as described above that indicates the other accounting requests for the session.

CDR generator 420 then queries the other CDFs for the accounting requests for the session (step 604). For example, CDR generator 420 may query CDF 121 and CDF 123 for accounting requests pertaining to a given session ID. The other CDFs respond back to CDF generator 420 with the accounting requests. CDR generator 420 processes the accounting requests for the session to generate a CDR (step 606). As an example using Diameter protocol, the reconciliation host may collate the ACRs for a session based on the value in the ARN AVP, remove any duplicate ACRs (indicated by the retransmission bit set in the Diameter header of the message in conjunction with the ARN), and generate the CDR for the session based on the ACRs. CDR generator 420 may then transmit the CDR to a CGF (e.g., CGF 132) through interface 412 (step 608).

In this embodiment, the reconciliation host knows which CDFs have accounting requests for the session based on the information in the tracking parameter of the stop accounting request. Thus, the reconciliation host knows exactly which CDFs to query for accounting requests instead of having to guess at which of the CDFs may hold accounting requests for a given session ID. This makes the process of generating a CDR much more efficient and less of a burden on resources within the OFCS.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:
1. An apparatus comprising:
a distributor unit configured to connect to a plurality of Charging Data Functions (CDFs) for offline charging;
the distributor unit comprising a processor configured to receive an interim accounting request from a Charging Trigger Function (CTF) for a session, wherein the interim accounting request includes a tracking parameter populated with at least one CDF identifier (ID) indicating at least one destination CDF that handled accounting requests for the session;
the distributor unit is configured to process the tracking parameter in the interim accounting request to identify a first CDF ID for a first destination CDF that handled accounting requests for the session;
when the first destination CDF is available to receive the interim accounting request, the distributor unit is configured to transmit the interim accounting request to the first destination CDF;
when the first destination CDF is not available to receive the interim accounting request, the distributor unit is configured to select a second destination CDF for the interim accounting request based on a distribution algorithm,
to add a second CDF ID for the second destination CDF in the tracking parameter of the interim accounting request, and to transmit the interim accounting request to the second destination CDF.

2. The apparatus of claim 1 wherein:
the distributor unit is configured to scan the tracking parameter for an appearance of the second CDF ID, and to add the second CDF ID in the tracking parameter when the second CDF ID does not already appear in the tracking parameter.

3. The apparatus of claim 1 wherein:
the distributor unit is configured to add the second CDF ID in the tracking parameter responsive to selecting the second destination CDF based on the distribution algorithm so that the tracking parameter indicates a sequence of destination CDFs that handled accounting requests for the session.

4. The apparatus of claim 1 wherein:
the interim accounting request comprises a Diameter Accounting Request (ACR); and
the tracking parameter comprises a Diameter Attribute Value Pair (AVP) defined for the CDF IDs indicating the CDFs that handled accounting requests for the session.

5. The apparatus of claim 1 wherein:
the distributor unit is configured to receive an interim accounting answer from the second destination CDF that includes the tracking parameter, and to send the interim accounting answer to the CTF.

6. The apparatus of claim 1 wherein:
the distribution algorithm comprises a consistent hashing algorithm that selects the second destination CDF based on a session identifier in the interim accounting request.

7. The apparatus of claim 1 further comprising:
the second destination CDF configured to receive a stop accounting request from the CTF indicating an end to the session, wherein the stop accounting request includes the tracking parameter;
the second destination CDF is configured to determine a total number of the accounting requests for the session, to determine a number of accounting requests handled by the second destination CDF, and to calculate a percentage of accounting requests handled by the second destination CDF;
when the percentage of accounting requests handled by the second destination CDF is greater than 50%, the second destination CDF is configured to select itself as a reconciliation host to generate a Charging Data Record (CDR) for the session;
when the percentage of accounting requests handled by the second destination CDF is less than 50%, the second destination CDF is configured to query other destination CDFs indicated in the tracking parameter for a number of accounting requests handled by each destination CDF, and to select the reconciliation host based on the destination CDF that handled the highest number of accounting requests.

8. A method comprising:
receiving an interim accounting request in a distributor unit from a Charging Trigger Function (CTF) for a session, wherein the distributor unit connects to a plurality of Charging Data Functions (CDFs) for offline charging;
wherein the interim accounting request includes a tracking parameter populated with at least one CDF identifier (ID) indicating at least one destination CDF that handled accounting requests for the session;
processing the tracking parameter in the interim accounting request to identify a first CDF ID for a first destination CDF that handled accounting requests for the session;
when the first destination CDF is available to receive the interim accounting request, transmitting the interim accounting request to the first destination CDF;
when the first destination CDF is not available to receive the interim accounting request:
selecting a second destination CDF for the interim accounting request based on a distribution algorithm;
adding a second CDF ID for the second destination CDF in the tracking parameter of the interim accounting request; and
transmitting the interim accounting request to the second destination CDF.

9. The method of claim 8 wherein adding a second CDF ID for the second destination CDF in the tracking parameter of the interim accounting request comprises:
scanning the tracking parameter for an appearance of the second CDF ID; and
adding the second CDF ID in the tracking parameter when the second CDF ID does not already appear in the tracking parameter.

10. The method of claim 8 wherein adding a second CDF ID for the second destination CDF in the tracking parameter of the interim accounting request comprises:
adding the second CDF ID in the tracking parameter responsive to selecting the second destination CDF based on the distribution algorithm so that the tracking parameter indicates a sequence of destination CDFs that handled accounting requests for the session.

11. The method of claim 8 wherein:
the interim accounting request comprises a Diameter Accounting Request (ACR); and
the tracking parameter comprises a Diameter Attribute Value Pair (AVP) defined for the CDF IDs indicating the CDFs that handled accounting requests for the session.

12. The method of claim 8 further comprising:
receiving an interim accounting answer from the second destination CDF that includes the tracking parameter; and
sending the interim accounting answer to the CTF.

13. The method of claim 8 wherein:
the distribution algorithm comprises a consistent hashing algorithm that selects the second destination CDF based on a session identifier in the interim accounting request.

14. The method of claim 8 further comprising:
receiving a stop accounting request in the second destination CDF from the CTF indicating an end to the session, wherein the stop accounting request includes the tracking parameter;
determining, in the second destination CDF, a total number of the accounting requests for the session;
determining a number of accounting requests handled by the second destination CDF;
calculating a percentage of accounting requests handled by the second destination CDF;
when the percentage of accounting requests handled by the second destination CDF is greater than 50%, selecting the second destination CDF as a reconciliation host to generate a Charging Data Record (CDR) for the session;
when the percentage of accounting requests handled by the second destination CDF is less than 50%, querying other destination CDFs indicated in the tracking parameter for a number of accounting requests handled by each destination CDF, and selecting the reconciliation host based on the destination CDF that handled the highest number of accounting requests.

15. An apparatus comprising:

a plurality of Charging Data Functions (CDFs) for offline charging for a session;

a first one of the CDFs comprising a selection unit configured to receive a stop accounting request for the session indicating an end to the session, wherein the stop accounting request includes a tracking parameter populated with CDF identifiers (IDs) indicating the CDFs that handled accounting requests for the session;

the selection unit is configured to select a reconciliation host to generate a Charging Data Record (CDR) for the session from the CDFs indicated in the tracking parameter.

16. The apparatus of claim 15 wherein:

the stop accounting request comprises a Diameter Accounting Request (ACR); and the tracking parameter comprises a Diameter Attribute Value Pair (AVP) defined for the CDF IDs indicating the CDFs that handled the accounting requests for the session.

17. The apparatus of claim 15 wherein:

the selection unit is configured to determine a total number of the accounting requests for the session, to determine a number of accounting requests handled by the first CDF, and to calculate a percentage of accounting requests handled by the first CDF;

when the percentage of accounting requests handled by the first CDF is greater than 50%, the selection unit is configured to select the first CDF as the reconciliation host to generate the CDR for the session.

18. The apparatus of claim 15 wherein:

the selection unit is configured to query other CDFs indicated in the tracking parameter for a number of accounting requests handled by each of the other CDFs, and to select the reconciliation host based on the CDF that handled the highest number of accounting requests for the session.

19. The apparatus of claim 18 wherein:

when a second one of the CDFs is selected as the reconciliation host, the first CDF is configured to send a notification message to the reconciliation host, wherein the notification message indicates the other CDFs that handled accounting requests for the session.

20. The apparatus of claim 15 wherein:

the first CDF further comprises:

a CDF generator configured to identify the other CDFs that handled accounting requests for the session, to query the other CDFs for the accounting requests for the session, to process the accounting requests to generate the CDR, and to forward the CDR to a Charging Gateway Function (CGF).

\* \* \* \* \*